(12) United States Patent
Saitou et al.

(10) Patent No.: US 6,599,651 B1
(45) Date of Patent: Jul. 29, 2003

(54) SEPARATOR OF PROTON EXCHANGE FUEL CELL AND ITS MANUFACTURING METHOD

(75) Inventors: Masahiro Saitou, Kanagawa-ken (JP); Kazuo Saito, Kanagawa-ken (JP); Kazutoshi Takaishi, Tokyo (JP); Masashi Takahashi, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/448,145

(22) Filed: Nov. 24, 1999

(30) Foreign Application Priority Data

Nov. 25, 1998 (JP) .......................................... 10-334738

(51) Int. Cl.[7] .............................................. H01M 2/16
(52) U.S. Cl. ........................................... 429/34; 429/30
(58) Field of Search .............................. 429/34, 38, 30; 29/623.1

(56) References Cited

U.S. PATENT DOCUMENTS

| | | | | |
|---|---|---|---|---|
| 5,578,388 A | * | 11/1996 | Faita et al. | 429/30 |
| 5,912,088 A | * | 6/1999 | Ernst | 429/35 |
| 6,022,634 A | * | 2/2000 | Ramunni et al. | 429/34 |
| 6,146,780 A | * | 11/2000 | Cisar et al. | 429/34 |
| 6,203,936 B1 | * | 3/2001 | Cisar et al. | 429/44 |
| 6,300,001 B1 | * | 10/2001 | Hornung et al. | 429/44 |

OTHER PUBLICATIONS

Internet Printout. "The Magnesium Home Page". (Keywords: Az91D and ASTM). No date.*
Internet Printout "Alluminio". http://www.fantoniadriano.com/AlloysList.htm 2000 (no month).*
Internet Printout "Anticorodal–72". http://www.vacono.com/pages/dwkwAc72.htm 2001 (no month).*
Internet Prinout "Anticordal–110". http://www.allega.ch/commonpages/techn_datasheets/engl/ac110.pdf Jul. 1999.*
Internet Printout (http://www.castingsource.com/tech_art_guide1.asp). A Guide to Aluminum Casting Alloys. May 22, 2002.*
Internet Printout "Von Roll Casting". Jun. 2000.*

* cited by examiner

Primary Examiner—Patrick Ryan
Assistant Examiner—Tracy Dove
(74) Attorney, Agent, or Firm—Oblon, Spivak, McClelland, Maier & Neustadt, P.C.

(57) ABSTRACT

A method of manufacturing the separator of the proton exchange fuel cell. In a cell stack of a proton exchange fuel cell, the cell stack composed by laminating a plurality of unit cells and a plurality of separators, each of the unit cells composed of an anode electrode, a cathode electrode and a solid polymer electrolytic membrane arranged between the anode and cathode electrodes, each of the separators arranged between the unit cells, respectively, the method of manufacturing the separator of the proton exchange fuel cell, includes the steps of, preparing step for preparing raw material for the separator, the raw material composed of alloy material including light metal, such as aluminum or magnesium, as a main component, and forming step for forming the separator from the raw material by die casting.

18 Claims, 9 Drawing Sheets

SEPARATOR OF PROTON EXCHANGE FUEL CELL AND ITS MANUFACTURING METHOD

BACKGROUND OF THE INVENTION

1. Field of the Invention

The present invention relates to a separator for a proton exchange fuel cell using solid polymer membrane as electrolyte and to a method of manufacturing the separator. More particularly, the present invention relates to a method of manufacturing a compact, light weight, separator for a proton exchange fuel cell with improved reliability and at low cost.

2. Description of the Related Art

A fuel cell is a device that converts chemical energy into electric energy by bringing a fuel such as hydrogen and an oxidizing agent such as air to electrochemically react with each other.

Various types of fuel cells which differ according to type of electrolyte used as known; for instance, phosphoric acid type, fused carbonate type, solid oxide type and proton exchange type. Of these fuel cells, a proton exchange fuel cell is a fuel cell utilizing the fact that when a polymer resin membrane containing a proton exchange radical is saturated with water it acts as proton conductive electrolyte. The proton exchange fuel cell acts in a relatively low temperature range with excellent power generating efficiency and has attracted attention in recent years.

Figure 6:
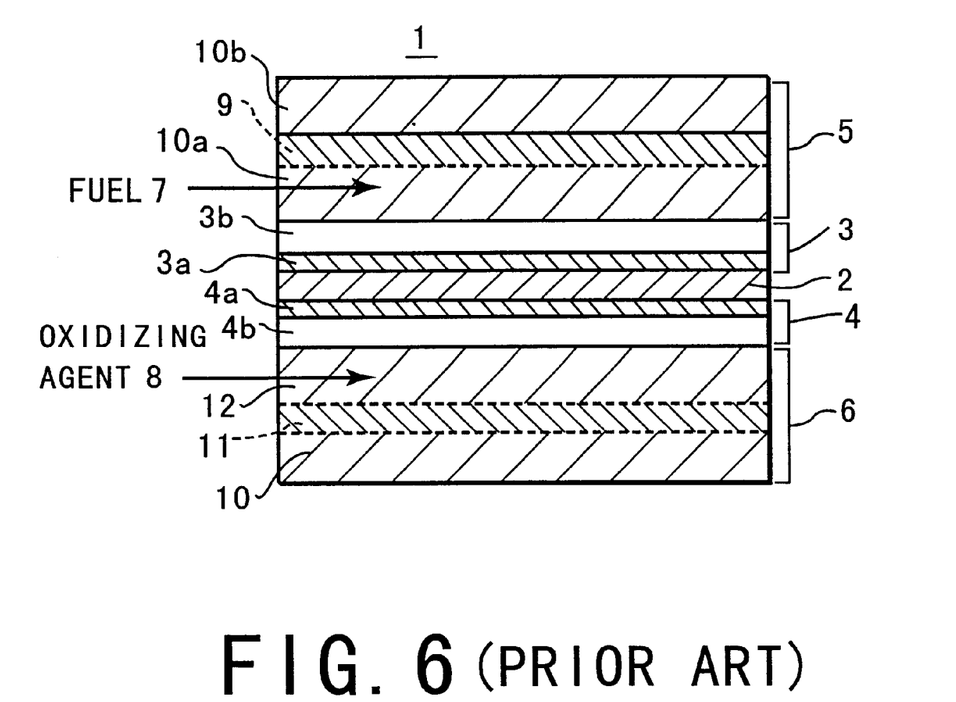
FIG. 6 is a diagram showing the structure of a conventional unit cell.

FIG. 6 is a diagram showing the structure of a unit cell that is a base unit of a conventional proton exchange fuel cell.

As shown in FIG. 6, a unit cell 1 is composed of an ion conductive solid polymer membrane 2, an anode electrode 3 and a cathode electrode 4 arranged with solid polymer membrane 2 interposed between them. Further, at the outsides of these electrodes 3, 4, there are arranged an anode electrode side separator 5 and a cathode electrode side separator 6, each of which is gas impermeable and has a gas supply groove for supplying reaction gas to one of electrodes 3, 4.

As ion conductive solid polymer membrane 2, for instance, perfluorocarbon-sulfonic acid (Nafion-R: Du Pont, U.S.A.), which is a proton exchange membrane, is known. Solid polymer membrane 2 contains a hydrogen ion exchange radical, and functions as an ion conductive electrolyte when saturated in water. Solid polymer membrane 2 also functions to separate a fuel 7 supplied on the anode electrode 3 side of the solid polymer membrane 2 from an oxidizing agent 8 supplied on the cathode electrode 4 side of the solid polymer membrane 2.

Anode electrode 3 arranged at one side of solid polymer membrane 2 is formed of a catalytic layer 3a and a porous carbon flat plate 3b. Further, cathode electrode 4 arranged opposing anode electrode 3 is formed of a catalytic layer 4a and a porous carbon flat plate 4b.

Separator 5 at the anode electrode side is composed of a separator substrate 9 and fuel supply grooves 10a, 10b arranged at both sides of separator substrate 9 for supplying fuel.

On the other hand, separator 6 arranged at the cathode electrode side is composed of a separator substrate 11, an oxidizing agent supply groove 12 for supplying an oxidizing agent arranged on one surface of separator substrate 11 at the surface side contacting cathode electrode 4, and a fuel supply groove 10 for supplying fuel arranged on another surface of separator substrate 11.

The principle of unit cell 1 will be described below.

When fuel 7 is supplied to anode electrode 3 and oxidizing agent 8 is supplied to cathode electrode 4, the electromotive force is generated by the electrochemical reaction between a pair of electrodes 3, 4 of unit cell 1. Normally, hydrogen is used as fuel 7 and air is used as oxidizing agent 8.

When hydrogen is supplied as fuel to anode electrode 3, hydrogen is ionized into hydrogen ion and electron in anode catalytic layer 3a (Anode reaction). The hydrogen ion moves to cathode electrode 4 through solid polymer membrane 2, and the electron moves to cathode electrode 4 through an external circuit. On the other hand, the oxygen contained in the air is supplied to cathode electrode 4 as oxidizing agent 8 causes the cathode reaction by the hydrogen ion and the electron in catalytic layer 4a to generate water. At this time, the electrons pass through the external circuit and become a current and is able to feed electric power. In other words, in anode electrode 3 and cathode electrode 4, reactions shown below will progress. Further, the generated water is discharged together with not-reacted gas to the outside of unit cell 1.

Anode Reaction: 
Cathode Reaction:

In such unit cell 1, if water content in solid polymer membrane 2 becomes less, ion resistance becomes high, and mixing of fuel 7 and oxidizing agent 8 (crossover) takes place, and unit cell 1 is not able to generate the electric power. So, it is desirable to keep solid polymer membrane 2 in the state saturated with water.

Further, when the hydrogen ion ionized in anode electrode 3 upon power generation moves to cathode electrode 4 through solid polymer membrane 2, water also moves jointly. So, at the anode electrode 3 side, solid polymer membrane 2 tends to become dry. Further, if moisture contained in supplied fuel 7 or supplied air is less, solid polymer membrane 2 tends to become dry at around respective inlet ports of reaction gases. For this reason, pre-humidified fuel 7 and pre-humidified oxidizing agent 8 are generally supplied to unit cell 1.

By the way, electromotive force of unit cell 1 is low as below 1 volt, and a cell stack is generally formed by laminating several tens to several hundreds of unit cells 1 via separators 5, 6 arranged at the upper and lower sides of unit cells 1. Cooling plates are inserted into respective unit cells 1 in order to control the temperature rise of the cell stack resulting from the power generation.

Separators 5, 6 used in a proton exchange fuel cell are required to be impermeable to reaction gas and cooling water so as to separate each of unit cells 1. On the other hand, separators 5, 6 are also required to be electrically conductive in order to laminate unit cells 1 to provide a cell stack and to function as the fuel cell. Normally, a proton exchange fuel cell is operated at relatively low temperature of 70~90° C. Separators 5, 6 inside the proton exchange fuel cell are under the severe environment where they are exposed to the air containing water vapor whose vapor pressure is close to a saturate vapor pressure at the temperature of 70~90° C., and at the same time, potential difference is generated between separators 5, 6 pursuant to the electrochemical reaction. So, it is necessary to select a corrosion proof material for the separators 5,6. As corrosion proof material, stainless steel, etc. are generally used. When stainless steel, etc. are applied to separators 5, 6, the surface thereof is oxidized and a passive state membrane is formed on the surface thereof. As a result, the resistance loss of the fuel cell becomes large and power generating efficiency drops to a large extent.

In the U.S.A., during 1970's, for the separators of the proton exchange fuel cell developed for the space shuttle, niobium which is excellent corrosion proof noble metal, was used. However, noble metal materials have such defects that they are extremely expensive and heavy. So, as disclosed in U.S. Pat. No. 5,521,018, Ballard Power Systems Inc. of Canada uses carbon plates for separators so as to reduce the weight and cost of a cell stack.

Figure 7:
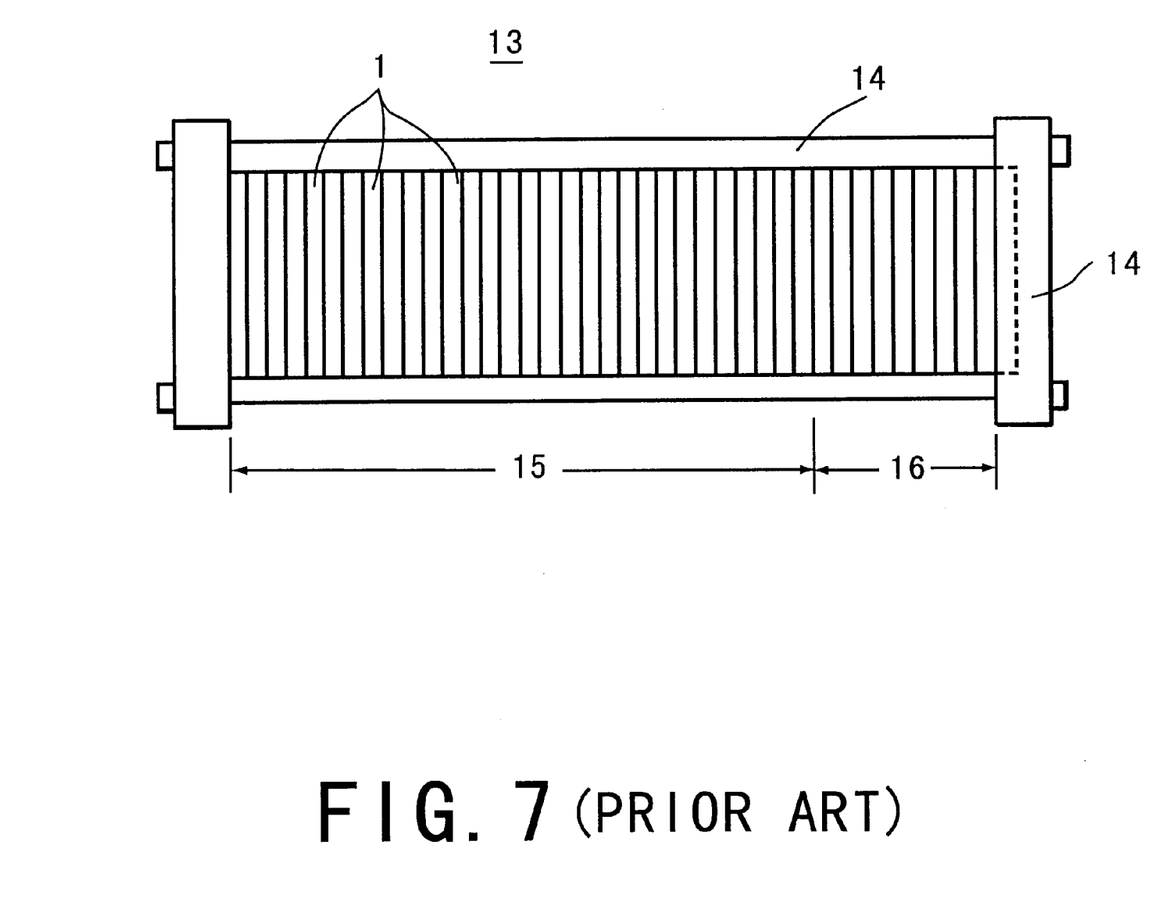
FIG. 7 is a diagram showing a conventional proton exchange fuel cell stack using carbon plates.

FIG. 7 shows the construction of a cell stack of a conventional proton exchange fuel cell using carbon plates for separators.

As sown in FIG. 7, a cell stack 13 is composed of, in an outer frame 14, a cell portion 15 which generates electric power by reacting gas, and a humidifying portion 16 for humidifying reaction gas. In cell portion 15, a plurality of unit cells 1 are arranged in outer frame 14.

Figure 8:
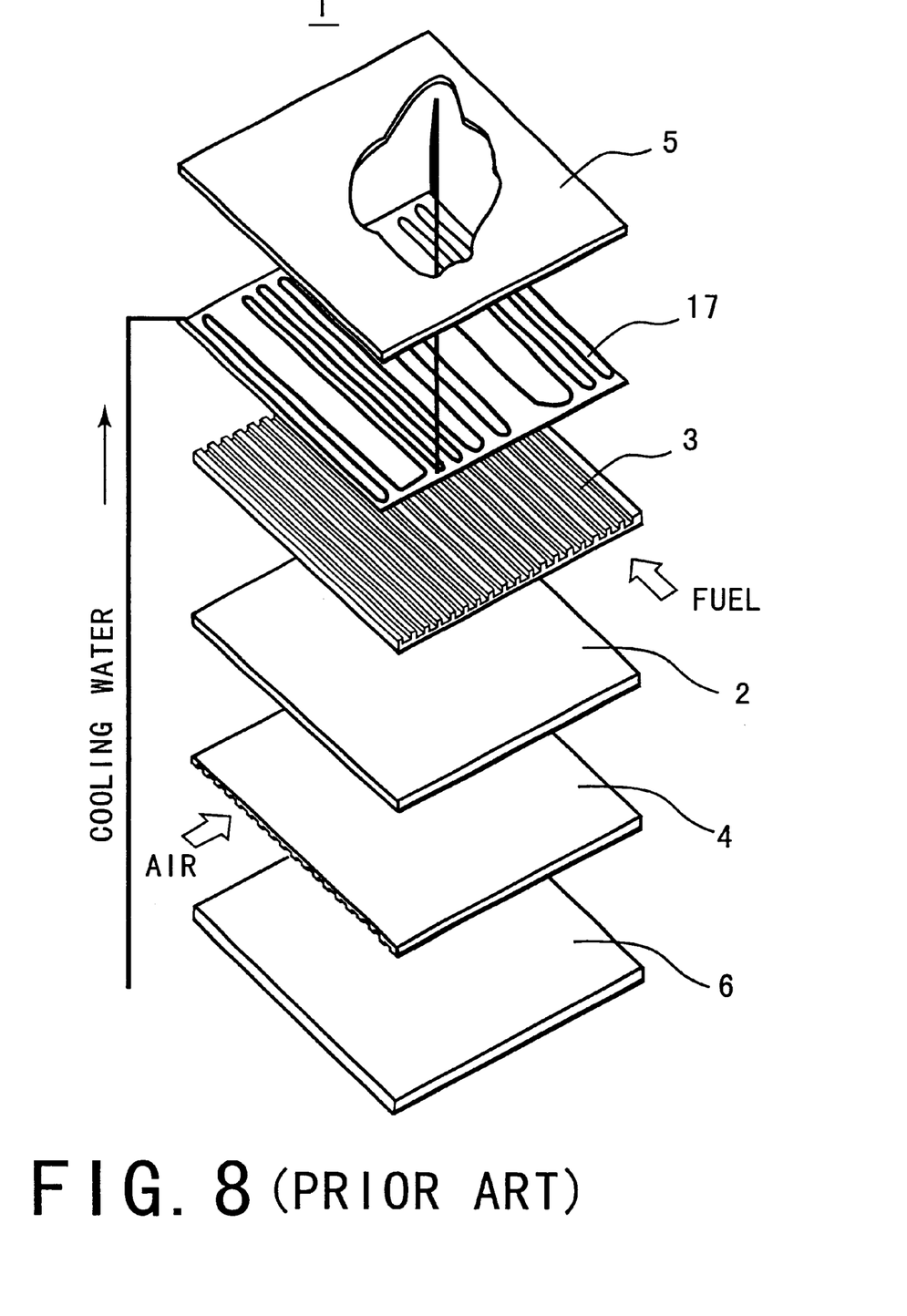
FIG. 8 is a diagram showing a structure of a unit cell of the cell portion of the conventional fuel cell shown in FIG. 7.

FIG. 8 is a schematic diagram showing the structure of conventional unit cell 1 in cell portion 15 shown in FIG. 7.

As shown in FIG. 8, in unit cell 1 arranged in cell portion 15 is in the structure as described below. Anode electrode 3 and cathode electrode 4 are arranged with ion conductive solid polymer membrane 2 interposed between them. A cooling separator 17 is provided at the outside of anode electrode 3, and anode electrode side separator 5 is provided at the further outside of cooling separator 17. Further, at the outside of cathode electrode 4, cathode electrode side separator 6 is provided.

Cooling separator 17 is provided to prevent the heating of the cell portion 15 by absorbing the reaction heat generated from the reaction by cooling water.

Figure 9:
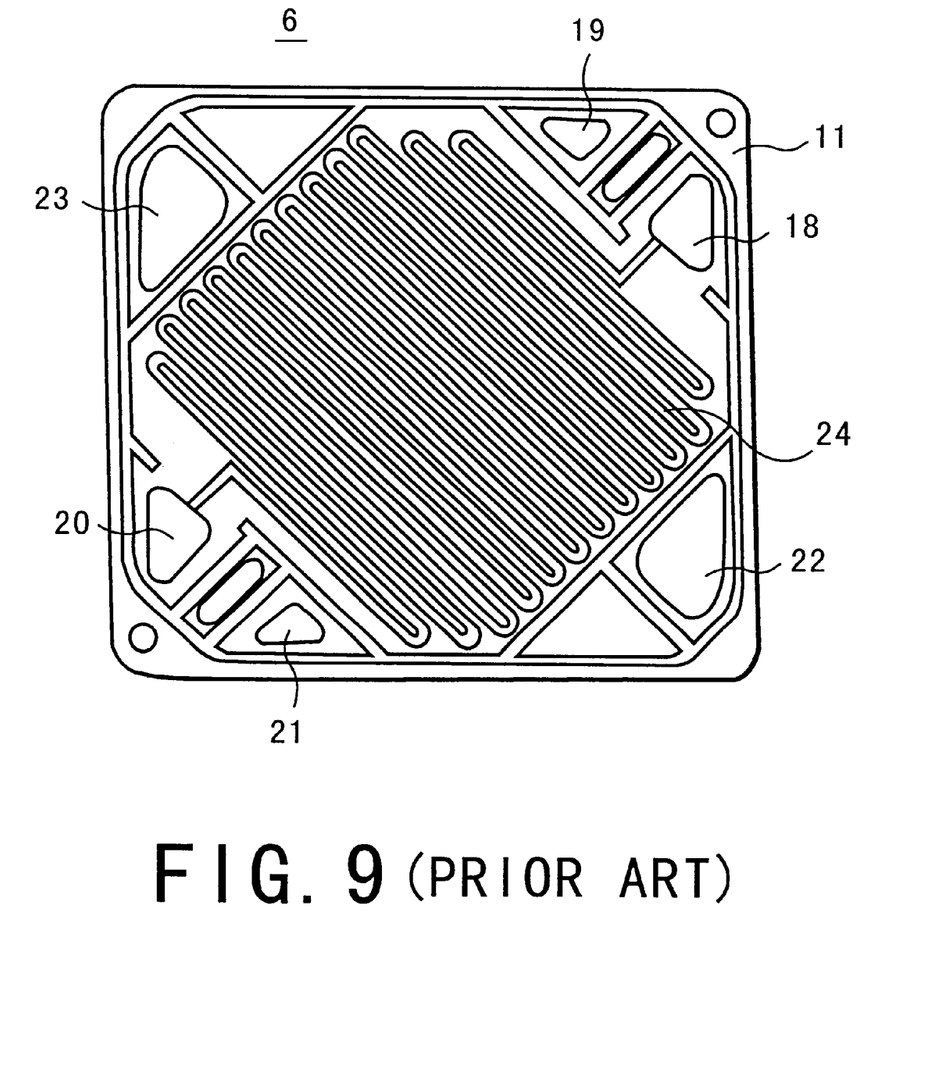
FIG. 9 is a plan view showing a conventional separator at the cathode electrode side.

FIG. 9 is a plan view showing the construction of conventional separator 6 provided at the cathode electrode side.

As shown in FIG. 9, separator 6 is composed of a nearly square shaped separator substrate 11 made of a carbon plate with an air induction port 18 for inducing air and a fuel gas induction port 19 for inducing fuel gas provided at one corner of separator substrate 11. At the side opposing these induction ports 18, 19, an air discharging port 20 for discharging air and a fuel gas discharging port 21 for discharging fuel gas are provided. Further, at other corners of separator substrate 11, a cooling water induction port 22 and a cooling water discharging port 23 are provided. On separator substrate 11, a serpentine shaped air groove 24 is formed for inducing air to the reaction surface. Air groove 24 connects air induction port 18 and air discharging port 20. Though not shown in FIG. 9, at the under side of separator substrate 11, the fuel supplying groove is formed, which connects fuel gas induction port 19 and fuel gas discharging port 21.

Air groove 24 is formed on separator substrate 11 made of relatively soft carbon plate by applying the press working at one surface thereof. Further, the fuel supplying groove is formed on separator substrate 11 by applying the press working at another surface thereof.

Further, although not illustrated here, separator 5 at the anode electrode side and cooling separator 17 have almost the same structure as that of separator 6 at the cathode electrode side.

The structure of humidifying portion 16 shown in FIG. 7 is almost the same as that of cell portion 15. In cell portion 15, reaction gasses mutually contact via solid polymer membrane 2. However, in humidifying portion 16, air or fuel gas, that is reaction gas, is humidified by contacting cooling water via a steam transmission membrane.

However, even in the case of separators 5, 6 as described above, there is still a restriction for making the thickness of separators 5, 6 thin.

As reasons for this, it is pointed out that first, in the case of a proton exchange fuel cell using a carbon plate for separators 5, 6, a certain thickness is needed for the carbon plate in order to maintain the strength as separators 5, 6. Secondly, a carbon plate is intrinsically porous material and it is necessary to prevent transmission of gas and water between the separators, and therefore, it is restricted to make the thickness of separators 5, 6 thin. In the U.S. Pat. No. 5,521,018, the thickness of separators is 1.6 mm and a certain thickness is demanded.

To make cell stack 13 compact, it is most important to make the thickness of unit cell 1 thin. However, when a carbon plate is applied to a separator, there is such a problem that, it is restricted to make the separators thin and it is difficult to make cell stack in a compact size.

Furthermore, as the carbon material itself is expensive, there is such a problem that it is difficult to provide a cell stack 13 at low cost.

Furthermore, as the carbon plate has lower thermal conductivity than that of such metals as aluminum, copper, etc., it is needed to cool down unit cells 1 by inserting cooling plates 17 to flow cooling water between respective unit cells 1. Accordingly, there is such a problem that a cell stack becomes a larger size, and air-cooling is difficult to adopt in the proton exchange fuel cell.

On the other hand, in the case wherein metal is used as separator substrate instead of carbon plate, there is such a problem that the corrosion is generated when using the separators in the saturated steam atmosphere or by the potential difference generated specifically to the fuel cell and thereby the cell performance drops.

Further, in the case of a metallic separator, it is considered that the separator is formed principally according to the pressing or machining. The separator can be formed at low cost by the pressing. But in the case of a separator containing material composed of a light metal as a main component, such as aluminum, magnesium, etc., the deformation of the separator by forming pressure, the wrinkles and break by the structural flow tend to be caused, and as a result, it was difficult to process the separator precisely.

SUMMARY OF THE INVENTION

Accordingly one object of this invention is to provide a separator of a proton exchange fuel cell in compact size and light weight at low cost.

Another object of this invention is to provide a manufacturing method of a separator of a proton exchange fuel cell in compact size and light weight at low cost.

These and other objects of this invention can be achieved by providing a method of manufacturing the separator of the proton exchange fuel cell. In a cell stack of a proton exchange fuel cell, the cell stack composed by laminating a plurality of unit cells and a plurality of separators, each of the unit cells composed of an anode electrode, a cathode electrode and a solid polymer electrolytic membrane arranged between the anode and cathode electrodes, each of the separators arranged between the unit cells, respectively, the method of manufacturing the separator of the proton exchange fuel cell, includes the steps of, preparing step for preparing raw material for the separator, the raw material composed of alloy material including light metal as a main component, and forming step for forming the separator from the raw material by die casting.

According to one aspect of this invention, there is provided a method of manufacturing the separator of the proton exchange fuel cell, wherein in the alloy material, the light metal includes Al or Mg.

As features of the die casting, a short filling time, high speed filling, high pressure filling and fast cooling speed of molten metal are enumerated. So, according to this invention, by using the die casting, a separator can be formed with the highly productivity, and excellent dimensional accuracy, requiring less post process. Further, a separator which is provided with smooth cast surface, is mechanically strong and can be formed thin is possible according to this invention.

So, according to this invention when separators are manufactured according to the die casting using an alloy material composed of Al or Mg, that is light metal, as a main component, it becomes possible make a cell stack light and compact. Further it becomes possible to manufacture a large quantity of separators in a short period of time, and thereby to reduce manufacturing cost per separator. Further, when an alloy material composed of Mg as a main component is used, it is possible to make the weight of separator and cell stack more light.

According to one aspect of this invention, there is provided a method of manufacturing the separator of the proton exchange fuel cell as described above, wherein in the alloy material includes one of alloy materials described below:

an alloy material composed of the following components (in weight %): Cu: 0.3~0.4%, Si: 12.0~12.2%, Mg: 0.08~0.11%, Mn: 0.23~0.24%, Fe: 0.64~0.74%, Zn: 0.09~0.10%, and Al: the remainder;

an alloy material composed of the following components (in weight %): Cu: 2.8~3.0%, Si: 8.4~8.6%, Mg: 0.08~0.10%, Mn: 0.32~0.37%, Fe: 0.70~0.71%, Zn: 0.13~0.14%, and Al: the remainder;

an material composed of the following components (in weight %): Cu: 1.9~2.5%, Si: 9.4~10.4%, Mg: 0.21~0.25%, Mn: 0.16~0.38%, Fe: 0.72~0.93%, Zn: 0.42~0.93%, Al: the remainder;

an material composed of the following components (in weight %): Cu: 0.01%, Si: 0.1%, Mn: 0.80%, Fe: 0.09%, Ni: 0.01%, Ti: 0.01% and Al: the remainder;

an alloy material composed of the following components (in weight %): Mn: 1.4~4.3%, Fe: 0.5~1.0%, and Al: the remainder;

an alloy material composed of the following components (in weight %): Cu: 0.05%, Co: 1.0% and Al: the remainder; and an alloy material composed of the following components (in weight %): Mn: 2.0%, Zn: 3.0%, Fe: 1.0%, Mg 0.5% and Al: the remainder.

When alloy materials composed of Al as a main component, with the composition stated as described above, are used, it is possible to manufacture highly reliable separators with good fluidity during the die casting and less casting defects. Further, it is possible to make highly strong separators which are thermally as well as electrically conductive.

According to another aspect of this invention, there is provided a method of manufacturing the separator of the proton exchange fuel cell as described above, wherein in the alloy material includes one of alloy materials described below:

an alloy material composing of the following components (in weight %): Al: 5.3~6.1%, Zn: 2.5~3.5%, Mn: 0.15~0.6%, Si: below 0.3%, Cu: below 0.1%, Ni: below 0.01%, and Mg: the remainder;

an alloy material comprising the following components (in weight %): Al: 8.1~9.3%, Zn: 0.4~1.0%, Mn: 0.13~0.5%, Si: below 0.3%, Cu: below 0.1%, Ni: below 0.01%, and Mg: the remainder;

an material comprising the following components (in weight %): Al: 8.3~9.7%, Zn: 1.6~2.4%, Mn: 0.1~0.5%, Si: below 0.3%, Cu: below 0.1%, Ni: below 0.01%, and Mg: the remainder;

an alloy material comprising the following components (in weight %): Al: 9.3~10.7%, Zn: 0.3%, Mn: 0.1~0.5%, Si: below 0.3%, Cu: below 0.1%, Ni: below 0.01%, and Mg: the remainder;

an alloy material comprising the following components (in weight %): Zn: 3.6~5.5%, Zr: 0.5~1.0%, Cu: below 0.1%, Ni: below 0.1%, and Mg: the remainder;

an alloy material comprising the following components (in weight %): Zn: 5.5~6.5%, Zr: 0.6~1.0%, Cu: below 0.1%, Ni: below 0.01%, and Mg: the remainder;

an alloy material comprising the following components (in weight %): Zn: 2.0~3.1%, Re: 2.5~4.0%, Zr: 0.5~1.0%,. Cu: below 0.1%, Ni: below 0.01%, and Mg: the remainder;

an alloy material comprising the following components (in weight %): Th: 2.5~4.0%, Zr: 0.5~1.0%, and Mg: the remainder;

an alloy material comprising the following components (in weight %): Th: 2.5~4.0%, Zn: 1.7~2.5%, Zr: 0.5~1.0%, and Mg: the remainder;

an alloy material comprising the following components (in weight %): Th: 1.4~2.2%, Zn: 5.2~6.2%, Zr: 0.5~1.0%, and Mg: the remainder;

an alloy material comprising the following components (in weight %): Zn: 2.0~3.5%, Zr: below 0.5%, and Mg: the remainder; and an alloy material comprising the following components (in weight %): Zn: 3.6~5.5%, Zr: 0.5~1.0%, and Mg: the remainder.

When alloy materials composed of Mg as a main component, with the composition stated as described above, are used, it is possible to manufacture highly reliable separators with good fluidity during the die casting and less casting defects. Further, it is possible to make highly strong separators which are thermally as well as electrically conductive. Further, when an alloy material composed of Mg as a main component is used, it is possible to make the weight of separator and cell stack more light.

According to one aspect of this invention, there is provided a method of manufacturing the separator of the proton exchange fuel cell, wherein the alloy material has thermal conductivity of 100~230 W/mK.

According to the present invention, heat generated during the operation can be efficiently cooled down. Further, because the separator is manufactured of Al alloy material of a light specific gravity, the cell stack can be made light and compact.

According to another aspect of this invention, there is provided a method of manufacturing the separator of the proton exchange fuel cell, wherein: the alloy material has electric conductivity of 30~60%.

According to the present invention, it is possible to reduce the electric contact resistance of separators, which is the important cell performance. As a result, it is possible to eliminate the voltage drop caused by the resistance of a unit cell composed of an anode electrode and a cathode electrode arranged on both sides of a solid polymer electrolytic membrane.

According to one aspect of this invention, there is provided a method of manufacturing the separator of the proton exchange fuel cell, wherein in the forming step, the separator is formed from the raw material by the die casting such that a thickness of the separator is 0.4 mm or more.

According to the present invention, as the deformation of the separator caused during the manufacturing by the die casting can be prevented, and the generation of casting defects can be minimized. As a result, a highly reliable cell stack can be made light and compact.

According to one aspect of this invention, there is provided a method of manufacturing the separator of the proton exchange fuel cell, wherein in the forming step, the die casting includes one kind or a composite process of two or more kinds of vacuum die casting, oxygen atmospheric die casting, atmospheric flow die casting, rheo-casting, acurad process, low speed filling die casting, high pressure casting, balance type flow die casting, car process, and parashot process.

According to this invention, it is possible to manufacture thin and complicated shaped separators in excellent accuracy in a short time at a low cost.

According to one aspect of this invention, there is provided a method of manufacturing the separator of the proton exchange fuel cell, further including the step of trimming step for trimming the separator formed by the die casting and treated by the surface treating step according to one of press machining, electric discharge machining, laser beam machining and photo-etching.

According to the present invention, it becomes possible to make additionally the machining of an opening and the forming of a thin portion that are difficult in the die casting. As a result, a thin and complicated shaped separator can be manufactured easily at a low cost.

According to one aspect of this invention, there is provided a method of manufacturing the separator of the proton exchange fuel cell, further including the step of surface treating step for treating a surface of the separator formed by the die casting according to one kind or a composite process of two or more kinds of buffing, barrel finishing, blasting, electro-polishing, and chemical treatment, such that surface roughness of the separator is 0.07 μm or more.

Furthermore, the surface of the separator after trimmed by the trimming step is treated again by the surface treating step as describe above.

According to the present invention, it is possible to completely remove burr, cohesion, rough casting surface produced in the die casting. As a result, it is possible to minimize the detects in the coating film during the corrosion resistant coating that is applied in the post processing, and thereby to improve the adhesion of the separator substrate with the coating film.

According to another aspect of this invention, there is provided a method of manufacturing the separator of the proton exchange fuel cell, further including the step of coating step for forming corrosion resistant coating film on the surface of the separator after the surface of the separator is made rough by the surface treating step according to one kind or a composite process of two or more kinds of physical evaporation process, plating process and spray process.

According to the present invention, it is possible to prevent the formation of passive state film of oxides produced in the saturated steam or in the potential corrosion environment specific to the fuel cell, and thereby to obtain a stabilized fuel cell output for a long time.

According to one aspect of this invention, there is provided a method of manufacturing the separator of the proton exchange fuel cell, further including the step of inspection step for conducting non-destructive inspection on the surface of the separator, after the die casting or after the corrosion resistant coating film is formed, according to one of infrared thermography, eddy current testing, magnetic particle testing, penetration inspection, ultrasonic testing, electromagnetic induction inspection, acoustic emission testing, macroscopic inspection, radiograph inspection, laser holography inspection and acoustic inspection.

According to the present invention, casting defects caused during the die casting and defects in the coating film produced during the corrosion resistant coating can be detected quickly by performing the non-destructive inspection as described above. As a result, it is possible to reflect the result of the inspection on the improvement of manufacturing conditions and thereby to manufacture highly reliable separators.

According to one aspect of this invention, there is provided a separator of the proton exchange fuel cell, wherein the separator is manufactured by using the one of the methods of manufacturing the separator of the proton exchange fuel cell as described above.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the several views, the embodiments of this invention will be described below.

First Embodiment (FIG. 1~FIG. 4)

Hereinafter, a first embodiment of this invention will be described with reference to FIGS. 1 to 4. In this embodiment, separators for a proton exchange fuel cell were manufactured according to a die casting using an alloy material mainly composed of Al.

Figure 1:
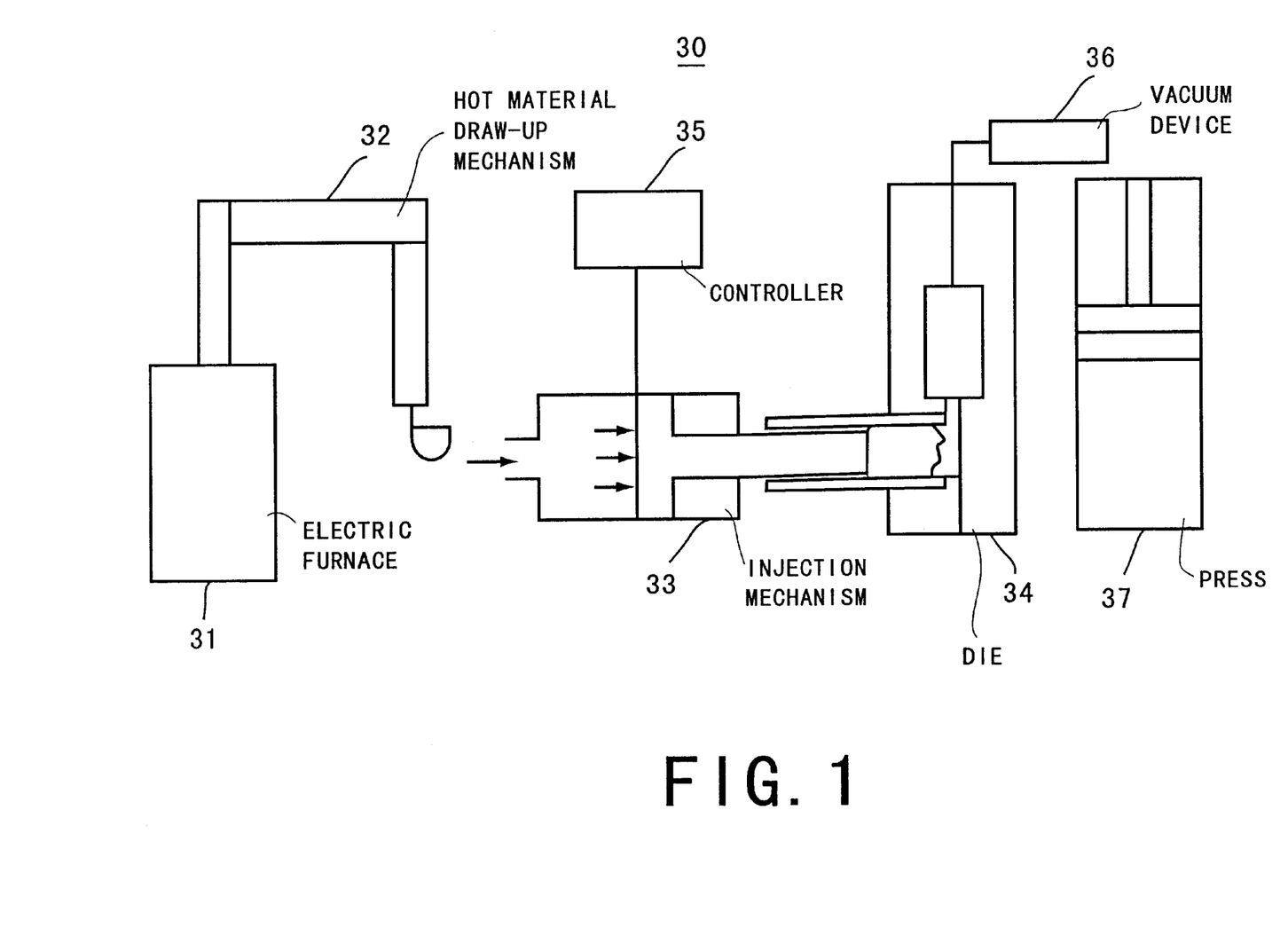
FIG. 1 is a schematic diagram showing a system that is used for the die casting according to a first embodiment of the present invention.

FIG. 1 is a diagram showing the outline of a system that is used for the die casting.

As shown in FIG. 1, in a die casting system 30, an electric furnace 31 for fusing raw material and an injection mechanism 33 are installed via a hot material draw-up mechanism 32 which draws up hot material from electric furnace 31. Further, a die 34 is arranged at the secondary side of injection mechanism 33. Further, a controller 35 is connected to injection mechanism 33 which controls hot material poured via hot material draw-up mechanism 32. A vacuum device 36 is connected to die 34 for removing impurities and air contained in hot material by making the system in the vacuous state during the injection forming. A press 37 is arranged at the final stage. This press performs the compression and gets formed products.

Using die casting system 30, molten alloy mainly composed of Al was compressed at a high speed and high pressure, and was cooled down quickly to solidify, and thereby an aluminum separator was manufactured, As an aluminum alloy material, a material containing (in weight %) Mn: 2.0%, Zn: 3.0%, Fe: 1.0%, Mg: 0.5%, and Al for the remainder was used.

Using the alloy material in such the composition, an aluminum separator was formed by die casting system 30 with the filling pressure of the maximum 2450 MPa shown in FIG. 1, under the conditions of the injection speed of 60 m/s, injection pressure of 1176 MPa and filling time of 0.3 seconds. The plan view of the aluminum separator thus obtained is shown in FIG. 2.

Figure 2:
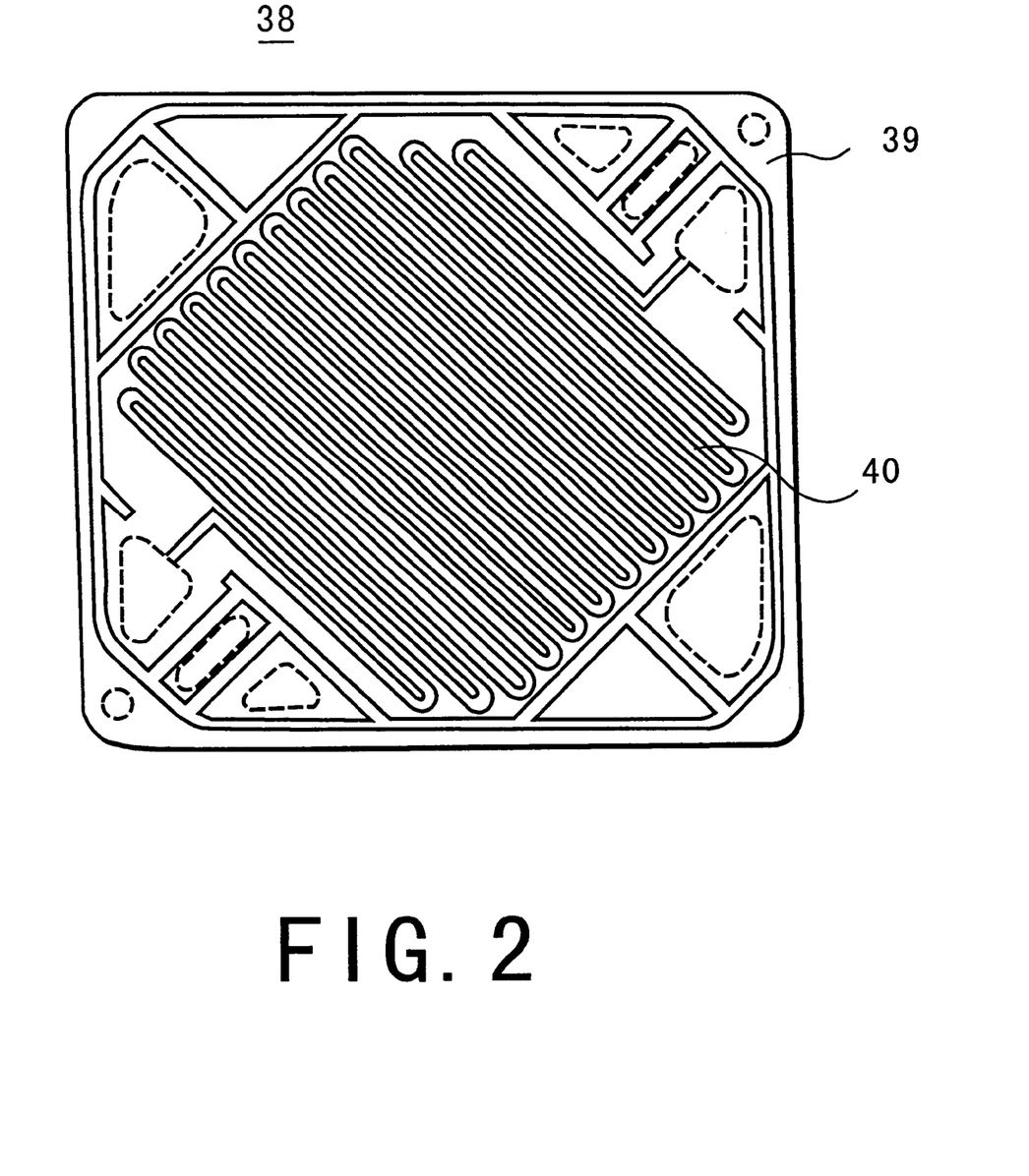
FIG. 2 is a plan view showing an aluminum separator obtained after the die casting according to the first embodiment of the present invention.

As shown in FIG. 2, an aluminum separator 38 is formed on a nearly square shaped separator substrate 39 with a serpentine shaped groove 40 formed thereon to lead air and fuel gas to the reaction surface.

Figure 3:
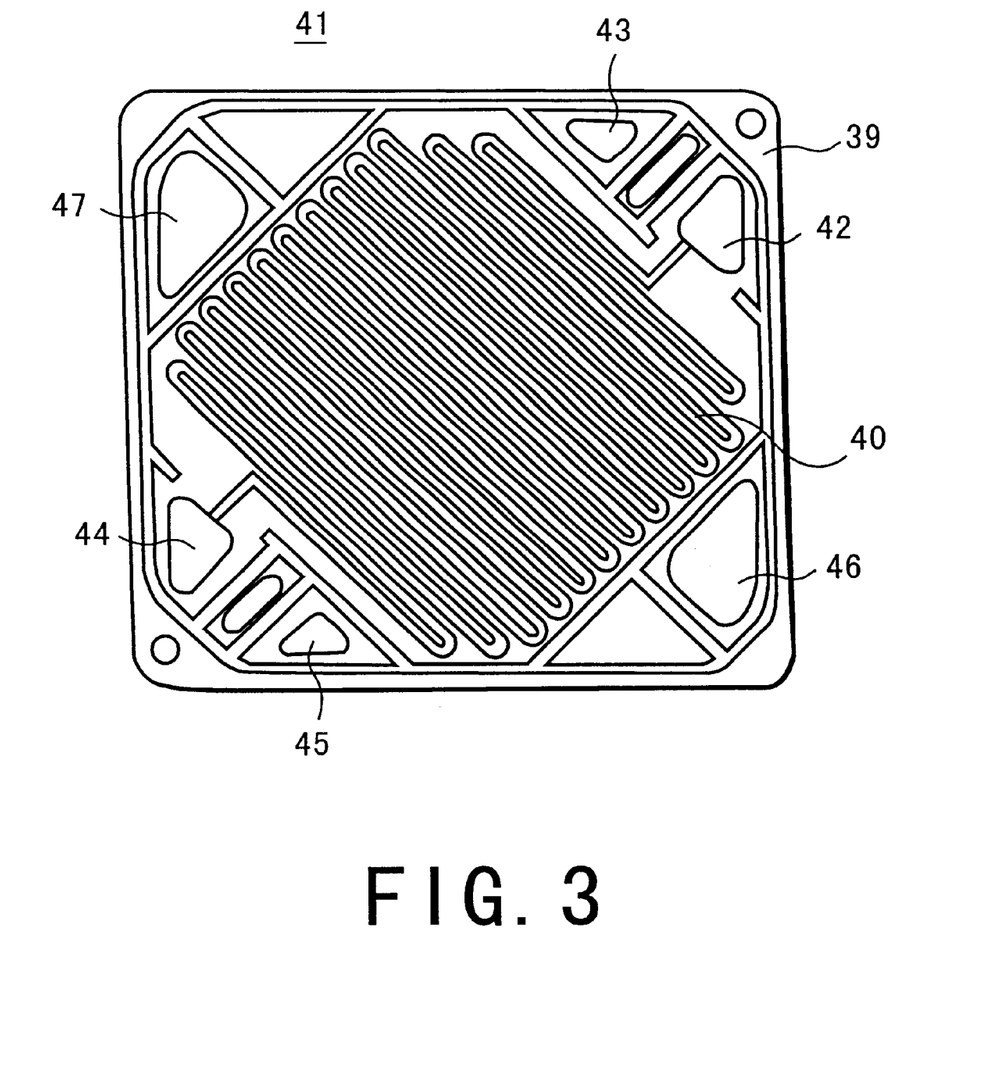
FIG. 3 is a plan view showing an aluminum separator with the objective shape after the trimming according to the first embodiment of the present invention.

In FIG. 2, portions shown by dotted lines are formed by the following trimming process, which will be well understood with reference to FIG. 3.

Then, aluminum separator 38 thus obtained was trimmed by one of the press machining, the electric discharge machining, the laser beam machining and the photo-etching, and thereby an aluminum separator 41 provided with the objective shape was obtained. The plan view of aluminum separator 41 thus obtained is shown in FIG. 3.

As shown in FIG. 3, aluminum separator 41 is provided with an air induction port 42 for inducing air and a fuel gas induction port 43 for inducing fuel gas provided at one corner of separator substrate 39. At the side opposing these induction ports 42, 43, an air discharging port 44 for discharging air and a fuel gas discharging port 45 for discharging fuel gas are provided. Further, at other corners of separator substrate 39, a cooling water induction port 46 and a cooling water discharging port 47 are provided. On separator substrate 39, a serpentine shaped air groove 40 is formed for inducing air to the reaction surface. Air groove 40 connects air induction port 42 and air discharging port 44. At the under side of separator substrate 39, the fuel supplying groove is formed, which connects fuel gas induction port 43 and fuel gas discharging port 44.

Aluminum separator 41 obtained according to the method described above has casting surface patterns at the casting and burrs at the trimming and cannot be directly used in the corrosion resisting coating that is subsequently performed. So, after the aluminum die casting and the trimming were performed, the surface of aluminum separator 38 and the surface of aluminum separator 41 were respectively treated according to one kind or a composite process two or more kinds of the buffing, barrel finishing, blasting, electro-polishing and chemical treatment, and the surface roughness of each of aluminum separators 38, 41 was made to 0.07 μm or more.

After treating the surface roughness of aluminum separator 41 to 0.07 μm or more, the passive state film or oxides on separator substrate 39 was electrically, mechanically or chemically removed.

Then, the conductive and corrosion resistance coating films were applied on aluminum separator 41 according to one kind or a composite process two or more kinds of the physical evaporation process, plating process and spray coating process. As the coating material, one kind or a composite material of two or more kinds of Ni, Fe, Co, B, Pb. Cr, Cu, Ti, Bi, Sn, W, P, Mo, Ag, Pt, Au, TiC, NbC, TiCN, TiN, CrN, $TiB_2$, $ZrB_2$, $Fe_2B$ and $Si_3N_4$ was used.

Definitely, using the plating process, Au was coated on separator substrate 39 and Ni or Cr layer was coated thereon.

Or, using the physical evaporation process, Cr or its alloy was coated on separator substrate 39 and TiN or its alloy was coated on the most outer layer.

Further, Cr or its alloy was coated on separator substrate 31, TiN or its alloy was coated thereon and Cr or its alloy was coated on the TiN or its alloy layer and TiN or its alloy was coated on the most outer layer. Thus, the multi-layered coatings were applied.

Further, as a result of this multi-layered coating applied, at the TiN layer of the coating surface, the drop of electric resistance when contacted is prevented. At the Cr layer thereunder, the adhesion strength with the TiN layer is improved and the peeling of the coating is prevented. Further, the corrosion factors such as oxygen and corrosion products entering through the air holes existing in the TiN layer are intercepted as they are turned to Cr oxide and the peeling of the coating caused by corrosion is prevented.

Further, at the TiN layer thereunder, such corrosion factors as oxygen and corrosion products entering through the air holes existing in the Cr layer are intercepted and the peeling of the coating caused by (corrosion resistance and) corrosion is prevented. At the Cr layer thereunder, the adhesion strength with the TiN layer is improved, the peeling of the coating is prevented, and also, corrosion factors such as oxygen and corrosion products entering through the air holes existing in the TiN are intercepted as they are turned to Cr oxide, and the peeling of the coating caused by corrosion is prevented.

The prevention of deformation and high precision machining of separators were difficult to improve by the machining or pressing. But according to this embodiment, they can be solved when separators are manufactured according to the die casting. As a result, a large amount of aluminum separators can be produced in a short time, and a manufacturing cost per separator can be reduced, and thereby the manufacturing of a light and compact cell stack is enabled. Further, using one kind or a composite process of two or more kinds of the vacuum die casting, oxygen atmospheric die casting, atmospheric flow die casting, rheo-casting, acurad process, low speed filling die casting, high pressure casting, balance type flow die casting, car process, and parashot process, thin and complicated shaped separators can be manufactured precisely in a short period of time at a low cost. In particular, the vacuum die casting process is able to make the casting while exhausting air bubbles and gas component existing in hot metal to the outside, and therefore, it is possible to obtain aluminum separators in uniform structure with less casting defects.

Burr, cohesion, casting surface roughness caused by the casting and burr, etc. produced as a result of the trimming can be completely removed by the surface treatment of aluminum separators 38, 41 obtained after the die casting and the trimming, respectively. As a result, the coating defects caused during the corrosion resistance coating, that is applied in the post process, can be minimized, and adhesion strength between separation base material 39 and the coating film can be improved. Further, when removing the passive state coating film or oxides existing on separator substrate 39, it is possible to improve adhesion strength of separator substrate 39 with the coating film. Therefore, the peeling of the coating film when forming the coating film can be prevented to a minimum, and the highly reliable coating with less defects such as air holes can be formed.

Further, by forming the coating film on separator substrate 39, it to possible to reduce electrical contact resistance of the separator, that is important for the cell performance, to prevent the voltage drop caused by the resistance of the unit cell and to improve the performance and reliability of a proton exchange fuel cell.

Accordingly, it is possible to form a thin coating film by these processes and to uniformly form a thin coating film of materials with less electric resistance and contact resistance. Further, it is also possible to form a material having excellent corrosion resistance minutely with few defects. Further, a material that is excellent in adhesion and ductility can be formed thin, uniform and minutely.

Further, by forming the coating film, the forming of the passive state coating film of the oxides produced in saturated steam or in the corrosion environment due to the potential difference specific to the fuel cell can be prevented. Further, the stabilized output of the fuel cell can be obtained for an long time when the coating film is formed. Further, the coating film was formed in the multi-layer structure in this embodiment. This multi-layer structure enables it to share the functions demanded for the coating films in respective coating layers and to fully extract the separator performance. Further, the multi-layer structure is capable of intercepting continuous air holes penetrating through the coating layer to the interface between the coating layer and the separator substrate, which are produced during the manufacturing. When fuel is supplied to the anode electrode and air, that becomes an oxidizing agent, is supplied to the cathode electrode, reaction gas such as hydrogen and oxygen are generated. But the corrosion caused by such reaction gas as hydrogen and oxygen or the corrosion caused in the saturated steam atmosphere can be prevented by providing the coating film. Furthermore, the adhesion of the coating film with the separator substrate can be improved, and as a result, the peeling of the coating film when forming the coating film is prevented, and a highly reliable coating film with less defects such as air holes, etc. can be formed. In addition, material adhesion efficiency when forming a coating film is improved and a manufacturing cost of the separator can be reduced.

Further, in this embodiment, aluminum separator 41 of the objective shape is obtained, which is provided with air induction port 42, air discharging port 44, fuel gas induction port 43, fuel gas discharging port 45, cooling water induction port 46 and cooling water discharging port 47 provided by the trimming. If these induction ports and discharging ports 42~47 were formed during the die casting, casting defects 48 are produced as shown in FIG. 4 due to improper flow of hot metal.

Figure 4:
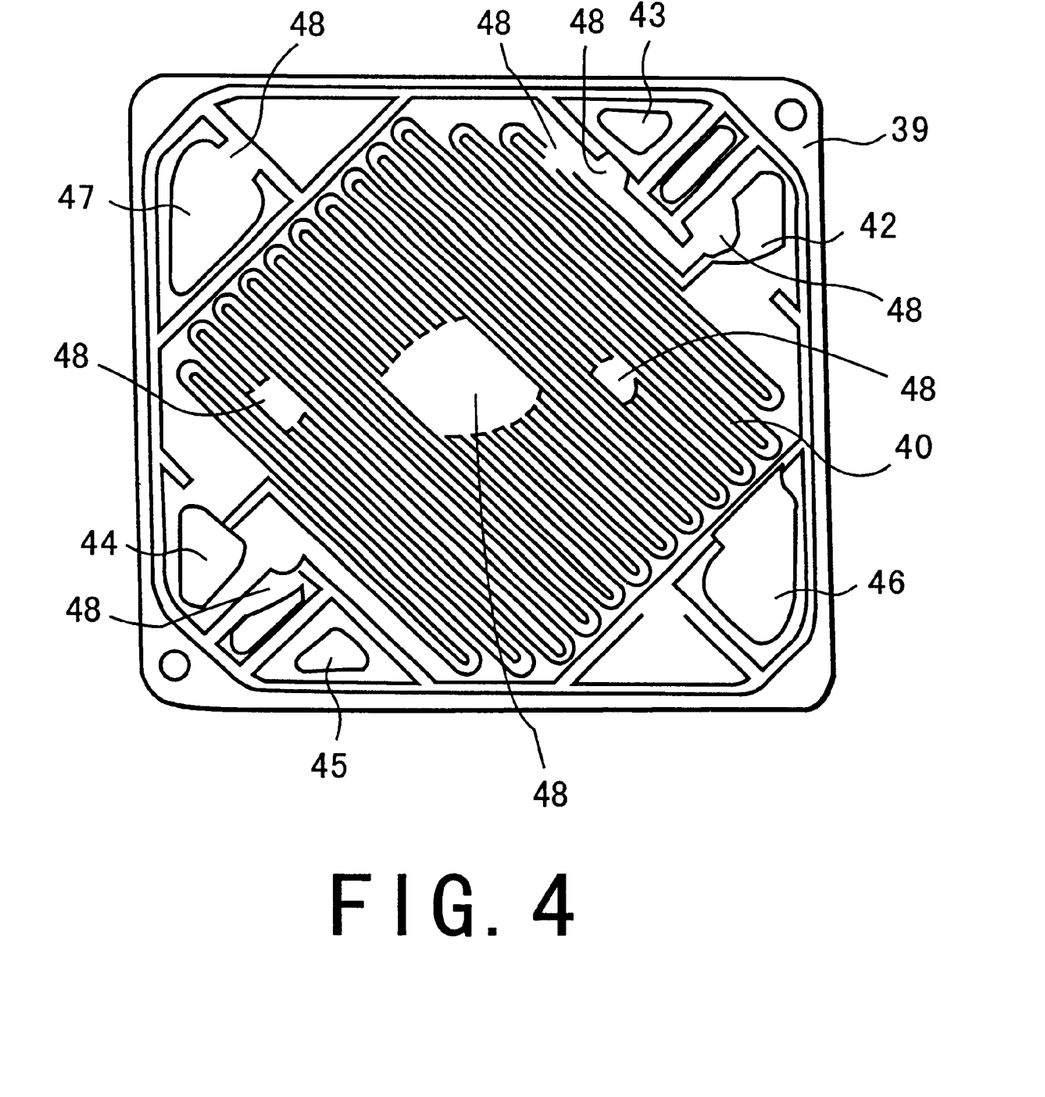
FIG. 4 is a diagram showing casting defects caused during the die casting according to the first embodiment of the present invention.

FIG. 4 is a diagram showing an aluminum separator in which induction ports and discharging ports 42~47 are provided during the die casting.

As shown in FIG. 4, casting defects 48 are formed in groove 40, air induction port 42, cooling water induction port 46 and cooling water discharging port 47, etc. formed on separator substrate 39.

When the complicated shape openings as described above are provided on the aluminum separator during the die casting, casting defects 48 are produced because of the misrun of hot material due to its improper flow and the yield of manufacturing aluminum separators drops for uneven plate thickness, etc.

Accordingly, in this embodiment, when serpentine shaped groove 40 is formed for leading air or fuel gas to the reaction surface during the aluminum die casting, and the induction ports and discharging ports 42~47 are then formed during the subsequent trimming process. Accordingly, it becomes possible to form openings and thin portions in the trimming process that are difficult to form by the die casting, and to manufacture a thin and complicated shaped aluminum separator easily at a low cost.

Second Embodiment (Table 1)

Hereinafter, a second embodiment of this invention will be described with reference to Table 1.

In this embodiment, alloy materials of the separator used as the raw material will be explained.

In this embodiment, the casting defect generating state was investigated by conducting the aluminum die casting tests by changing the compositions of aluminum alloy materials using Examples No. 1~No. 16 as shown in Table 1. A die casting system having the filling pressure of the maximum 2450 MPa was used. The die casting condition was of the injection speed of 60 m/s, injection pressure of 1176 MPa and filling time of 0.3 seconds. Casting defects generated in this die casting are shown in Table 1.

TABLE 1

| | Chemical Composition (wt. %) | | | | | | | | | | |
|---|---|---|---|---|---|---|---|---|---|---|---|
| Example No. | Cu | Si | Mg | Mn | Fe | Zn | Ni | Ti | Co | Al | Casting Defect (Y/N) |
| 1 | — | — | — | 1.4 | 0.5 | — | — | — | — | Bal. | No |
| 2 | 0.01 | 0.1 | — | 1.4 | 0.5 | — | — | — | — | Bal. | Yes |
| 3 | — | — | — | 4.3 | 1.0 | — | — | — | — | Bal. | No |
| 4 | 0.01 | 0.1 | — | 4.3 | 1.0 | — | — | — | — | Bal. | Yes |

TABLE 1-continued

| Example No. | Chemical Composition (wt. %) | | | | | | | | | | Casting Defect (Y/N) |
|---|---|---|---|---|---|---|---|---|---|---|---|
| | Cu | Si | Mg | Mn | Fe | Zn | Ni | Ti | Co | Al | |
| 5 | 0.01 | 0.1 | — | 0.80 | 0.09 | — | 0.01 | 0.01 | — | Bal. | No |
| 6 | 0.05 | — | — | — | — | — | — | — | 1.0 | Bal. | No |
| 7 | 0.1 | 10.0 | 0.05 | 0.23 | 0.44 | 0.05 | — | — | — | Bal. | Yes |
| 8 | 0.2 | 11.0 | 0.05 | 0.23 | 0.54 | 0.06 | — | — | — | Bal. | Yes |
| 9 | 0.3 | 12.0 | 0.08 | 0.23 | 0.64 | 0.09 | — | — | — | Bal. | No |
| 10 | 0.4 | 12.2 | 0.11 | 0.24 | 0.74 | 0.10 | — | — | — | Bal. | No |
| 11 | 0.6 | 10.0 | 0.10 | 0.20 | 0.70 | 0.22 | — | — | — | Bal. | Yes |
| 12 | 1.9 | 9.4 | 0.21 | 0.16 | 0.72 | 0.42 | — | — | — | Bal. | No |
| 13 | 2.5 | 10.4 | 0.25 | 0.38 | 0.93 | 0.93 | — | — | — | Bal. | No |
| 14 | 2.7 | 9.8 | 0.07 | 0.33 | 0.70 | 0.09 | — | — | — | Bal. | yes |
| 15 | 2.8 | 8.4 | 0.08 | 0.32 | 0.70 | 0.13 | — | — | — | Bal. | No |
| 16 | 3.0 | 8.6 | 0.10 | 0.37 | 0.71 | 0.14 | — | — | — | Bal. | No |

As shown in Table 1, casting defects were generated on aluminum alloy materials having the compositions for Examples Nos. 2, 4, 7, 8, 11 and 14, respectively. But no casting defects were generated on aluminum alloy materials having the compositions for Examples Nos. 1, 3, 5, 6, 9, 10, 12, 13, 15 and 16, respectively.

Therefore, it is optimum to use aluminum alloy materials having one of the compositions described below:

(1) An alloy material composed of the following components (in weight %): Cu: 0.3~0.4%, Si: 12.0~12.2%, Mg: 0.08~0.11%, Mn: 0.23~0.24%, Fe: 0.64~0.74%, Zn: 0.09~0.10%, and Al: the remainder. (Example Nos. 9 and 10)

(2) An alloy material composed of the following components (in weight %): Cu: 2.8~3.0%, Si: 8.4~8.6%, Mg: 0.08~0.10%, Mn: 0.32~0.37%, Fe: 0.70~0.71%, Zn: 0.13~0.14%, and Al: the remainder. (Example Nos. 15 and 16)

(3) An alloy material composed of the following components (in weight %): Cu: 1.9~2.5%, Si: 9.4~10.4%, Mg: 0.21~0.25%, Mn: 0.16~0.38%, Fe: 0.72~0.93%, Zn: 0.42~0.93%, Al: the remainder. (Example Nos. 12 and 13)

(4) An alloy material composed of the following components (in weight %): Cu: 0.01%, Si: 0.1%, Mn: 0.80%, Fe: 0.09%, Ni: 0.01%, Ti: 0.01% and Al: the remainder. (Example No. 5)

(5) An alloy material composed of the following components (in weight %): Mn: 1.4~4.3%, Fe: 0.5~1.0%, and Al: the remainder. (Example Nos. 1 and 3)

(6) An alloy material composed of the following components (in weight %): Cu: 0.05%, Co: 1.0% and Al: the remainder. (Example No. 6)

(7) An alloy material composed of the following components (in weight %): Mn: 2.0%, Zn: 3.0%, Fe: 1.0%, Mg: 0.5% and Al: the remainder. (The material used in the first embodiment)

In the die casting, the composition of an alloy material used in the die casting governs the fluidity of hot metal and affects the generation of casting defects. However, when aluminum alloy materials shown in this embodiment are used, the fluidity of hot metal is good during the die casting, and a highly reliable separator with less casting defects can be obtained.

Further, although alloy materials mainly composed or aluminum were used in this embodiment, alloy materials containing magnesium as a main component are also usable.

Concrete compositions of alloy materials containing magnesium as a main component are enumerated below:

(1) An alloy material composing of the following components (in weight %): Al: 5.3~6.1%, Zn: 2.5~3.5%, Mn: 0.15~0.6%, Si: below 0.3%, Cu: below 0.1%, Ni: below 0.01%, and Mg: the remainder.

(2) An alloy material comprising the following components (in weight %): Al: 8.1~9.3%, Zn: 0.4~1.0%, Mn: 0.13~0.5%, Si: below 0.3%, Cu: below 0.1%, Ni: below 0.01%, and Mg: the remainder.

(3) An alloy material comprising the following components (in weight %): Al: 8.3~9.7%, Zn: 1.6~2.4%, Mn: 0.1~0.5%, Si: below 0.3%, Cu: below 0.1%, Ni: below 0.01%, and Mg: the remainder.

(4) An alloy material comprising the following components (in weight %): Al: 9.3~10.7%, Zn: 0.3%, Mn: 0.1~0.5%, Si: below 0.3%, Cu: below 0.1%, Ni: below 0.01%, and Mg: the remainder.

(5) An alloy material comprising the following components (in weight %): Zn: 3.6~5.5%, Zr: 0.5~1.0%, Cu: below 0.1%, Ni: below 0.1%, and Mg: the remainder.

(6) An alloy material comprising the following components (in weight %): Zn: 5.5~6.5%, Zr: 0.6~1.0%, Cu: below 0.1%, Ni: below 0.01%, and Mg: the remainder.

(7) An alloy material comprising the following components (in weight %): Zn: 2.0~3.1%, Re: 2.5~4.0%, Zr: 0.5~1.0%, Cu: below 0.1%, Ni: below 0.01%, and Mg: the remainder.

(8) An alloy material comprising the following components (in weight %): Th: 2.5~4.0%, Zr: 0.5~1.0%, and Mg: the remainder.

(9) An alloy material comprising the following components (in weight %): Th: 2.5~4.0%, Zn: 1.7~2.5%, Zr: 0.5~1.0%, and Mg: the remainder.

(10) An alloy material comprising the following components (in weight %): Th: 1.4~2.2%, Zn: 5.2~6.2%, Zr: 0.5~1.0%, and Mg: the remainder.

(11) An alloy material comprising the following components (in weight %): Zn: 2.0~3.5%, Zr: below 0.5%, and Mg: the remainder.

(12) An alloy material comprising the following components (in weight %): Zn: 3.6~5.5%, Zr: 0.5~1.0%, and Mg: the remainder.

Even when alloy materials containing Mg as a main component as shown above are used, a highly reliable separator with less casting defects can be obtained. Further, because magnesium is used as the main component, the separator can be made lighter than the separator made of aluminum alloy material.

Third Embodiment (Tables 2 and 3)

Hereinafter, a third embodiment of this invention will be described with reference to Tables 2 and 3.

In this embodiment, it will be explained that the thermal conductivity of aluminum alloy material is set at 100~230 W/mK and the electric conductivity thereof is set at 30~60%.

First, the thermal conductivity of aluminum alloy material was investigated.

In this embodiment, as aluminum alloy materials, Examples No. 17~No. 34 of which thermal conductivities were changed from 53 to 230 W/mK shown in Table 2 were used.

TABLE 2

| Example No. | Thermal Conductivity (W/mK) | Generated Voltage (V) | Contact Resistance (mΩ/cm$^2$) | Judgement |
|---|---|---|---|---|
| 17 | 53 | 0.36 | 23 | x |
| 18 | 61 | 0.42 | 19 | x |
| 19 | 74 | 0.34 | 30 | x |
| 20 | 83 | 0.32 | 15 | x |
| 21 | 92 | 0.37 | 20 | x |
| 22 | 100 | 0.60 | 8 | ○ |
| 23 | 114 | 0.61 | 9 | ○ |
| 24 | 121 | 0.61 | 8 | ○ |
| 25 | 133 | 0.60 | 7 | ○ |
| 26 | 140 | 0.60 | 7 | ○ |
| 27 | 152 | 0.60 | 8 | ○ |
| 28 | 163 | 0.61 | 7 | ○ |
| 29 | 173 | 0.61 | 5 | ○ |
| 30 | 181 | 0.60 | 5 | ○ |
| 31 | 201 | 0.61 | 4 | ○ |
| 32 | 214 | 0.60 | 4 | ○ |
| 33 | 222 | 0.62 | 5 | ○ |
| 34 | 230 | 0.60 | 5 | ○ |

Using Examples No. 17~NO. 34 of aluminum alloy material, aluminum separators were manufactured by the die casting system having the filling pressure of the maximum 2450 Mpa, under the conditions of the injection speed of 60 m/s, the injection pressure of 1176 MPa and the filling time of 0.3 seconds.

Proton exchange fuel cell stacks were formed using the thus obtained aluminum separators, and the voltage drops and the changes in contact resistance in the power generation of the unit cells were measured, respectively. The measured results are shown in Table 2.

As performance of these aluminum separators, the objective set values are as follows: the generated voltage of a unit cell is 0.6V and the contact resistance of an aluminum separator is 10 mΩ/cm$^2$. As shown for the alloy materials of Examples No. 17~No. 21 in Table 2, when thermal conductivity of the separator becomes worse, these objective set values cannot be secured, and thereby the generating voltage drop and contact resistance drop will result. In other words, it can be seen that aluminum alloy material having thermal conductivity of 100~230 W/mK only is able to secure the above-described objective set values.

Then, the electric conductivity of aluminum alloy materials was investigated.

In this embodiment, as aluminum alloy materials, Examples No. 35~No. 50 of which electric conductivities were changed from 30 to 107% shown in Table 3 were used. Further, electric conductivity shown in Table 3 is a value expressed in terms of percentage (%) against the standard aluminum electric conductivity at 20° C.

TABLE 3

| Example No. | Conductivity (%) | Generated Voltage (V) | Contact Resistance (mΩ/cm$^2$) | Judgement |
|---|---|---|---|---|
| 35 | 30 | 0.60 | 4 | ○ |
| 36 | 32 | 0.62 | 6 | ○ |
| 37 | 41 | 0.64 | 5 | ○ |
| 38 | 42 | 0.62 | 5 | ○ |
| 39 | 53 | 0.67 | 7 | ○ |
| 40 | 56 | 0.60 | 8 | ○ |
| 41 | 60 | 0.61 | 9 | ○ |
| 42 | 68 | 0.57 | 12 | x |
| 43 | 71 | 0.41 | 23 | x |
| 44 | 73 | 0.36 | 19 | x |
| 45 | 80 | 0.34 | 30 | x |
| 46 | 83 | 0.38 | 15 | x |
| 47 | 91 | 0.45 | 20 | x |
| 48 | 95 | 0.41 | 15 | x |
| 49 | 104 | 0.33 | 35 | x |
| 50 | 107 | 0.42 | 24 | x |

Using alloy materials of Examples No. 35~No. 50 shown in Table 3, aluminum separators were manufactured by the die casting system having the filling pressure of the maximum 2450 Mpa, under the conditions of the injection speed of 60 m/s, the injection pressure of 1176 MPa and the filling time of 0.3 seconds.

Proton exchange fuel cell stacks were formed using the thus obtained aluminum separators, and the voltage drops and the change in contact resistance in the power generation of the unit cells were measured, respectively. The measured results are shown in Table 3.

As preformance of these aluminum separators, the objective set values are as follows: the generated voltage of a unit cell is 0.6V and the contact resistance of an aluminum separator is 10 mΩ/cm$^2$. As shown in Table 3, likewise Table 2, when electric conductivity of the separator becomes worse, these objective set cannot be secured, and thereby the generating voltage drop and contact resistance drop will result. In other words, it can be seen that aluminum alloy material having electric conductivity of 30~60% only is able to secure the above-described objective set values.

So, according to this embodiment, when aluminum alloy materials having thermal conductivity of 100~230 W/mK are used as the material for the separator in the die casting, it is possible to cool down the heat generated during the operation efficiently. As a result, it becomes possible to simplify a cooling device and to obtain a light and compact cell stack.

Thus, as an excellent heat conductive material is used for the separator, the separator can be used as an air-cooled radiating fin, and as a result, an air-cooling system can be adopted. When the air-cooling system is adopted, cooling water and a piping for circulation of cooling water, pump, etc. become unnecessary, and as a result, the system is simplified. Further, cooling water manifold holes in the cell stack become unnecessary and a cell stack composed of a compact system is obtained. Further, as cooling water is not used, there is no possibility for freezing even in a cold area wherein the temperature drops below 0° C. and a highly reliable cell stack can be obtained. Furthermore, as a metallic separator has a better gas sealing performance than a carbon which is a porous material, a thinner separator can be obtained than the separator made of carbon. As a result, a cell stack can be made more compact in size.

Further, cooling water is generally used for humidifying gas that is not yet reacted. But as the cell stack in this embodiment is of air cooling type with no cooling water, cooling water is not used for humidification. However, the cell stack has a self humidifying portion, and it is therefore not required to newly install a source of water for humidification, and a tank, pump, etc. become unnecessary. As a result, it becomes possible to make a cell stack in a compact size.

Further, as the metallic separator according to this embodiment has excellent electric conductivity and low electric resistance, it is possible to lower the electric contact resistance that is an important cell performance and to eliminate the voltage drop due to the resistance of the unit cell.

Further, when aluminum alloy material having electric conductivity of 30~60% is used as a material for the aluminum die casting, it is possible to lower the electric contact resistance of an aluminum separator, which is important cell performance and to eliminate the voltage drop due to the resistance of the unit cell.

Forth Embodiment (Table 4)

Hereinafter, a fourth embodiment of this invention will be described with reference to Table 4.

In this embodiment, it will be explained that the thickness of aluminum separator is specified at 0.4 mm or more.

In this embodiment, using Examples No. 51~No. 60 of which aluminum separator thickness were changed from 0.1 mm~1.0 mm shown in Table 4, the state of casting defects generated on the inner and outer surfaces of the aluminum separators were checked. A die casting system having the filling pressure of the maximum 2450 MPa was used. The die casting condition was of the injection speed of 60 m/s, injection pressure of 1176 MPa and filling time of 0.3 seconds. Casting defects generated in this die casting are shown in Table 4.

TABLE 4

| Example No. | Die Casting Thickness (mm) | Casting Defective (Y/N) |
|---|---|---|
| 51 | 0.1 | Yes |
| 52 | 0.2 | Yes |
| 53 | 0.3 | Yes |
| 54 | 0.4 | No |
| 55 | 0.5 | No |
| 56 | 0.6 | No |
| 57 | 0.7 | No |
| 58 | 0.8 | No |
| 59 | 0.9 | No |
| 60 | 1.0 | No |

As clear from Table 4, casting defects tend to occur on Examples No. 51~No. 53 with the thickness of the separator of 0.1 mm~0.3 mm and the generation of casting defects drop extremely on Examples No. 54~No. 69 with the thickness of the separator of 0.4 mm or more. That is, casting defect rate differs generally depending on hot metal temperature, injection pressure, injection speed, etc. In manufacturing aluminum separators according to the die casting of this embodiment, it is seen that it is difficult to manufacture separators of the thickness of 0.3 mm or below.

Accordingly, when aluminum separators manufactured according to the die casting are made thicker than 0.4 mm or more, it is possible to prevent the deformation of aluminum separator caused during the die casting process, to minimize the casting defect generating rate. As a result, it becomes possible to proved a highly reliable, light weight and compact cell stack. Further, it is also possible to make the thickness of separator thinner than that of the conventional separator made of carbon material, that is, it is possible to make the thickness of the separator to approximately ⅕ times that of the conventional separator.

Figure 5:
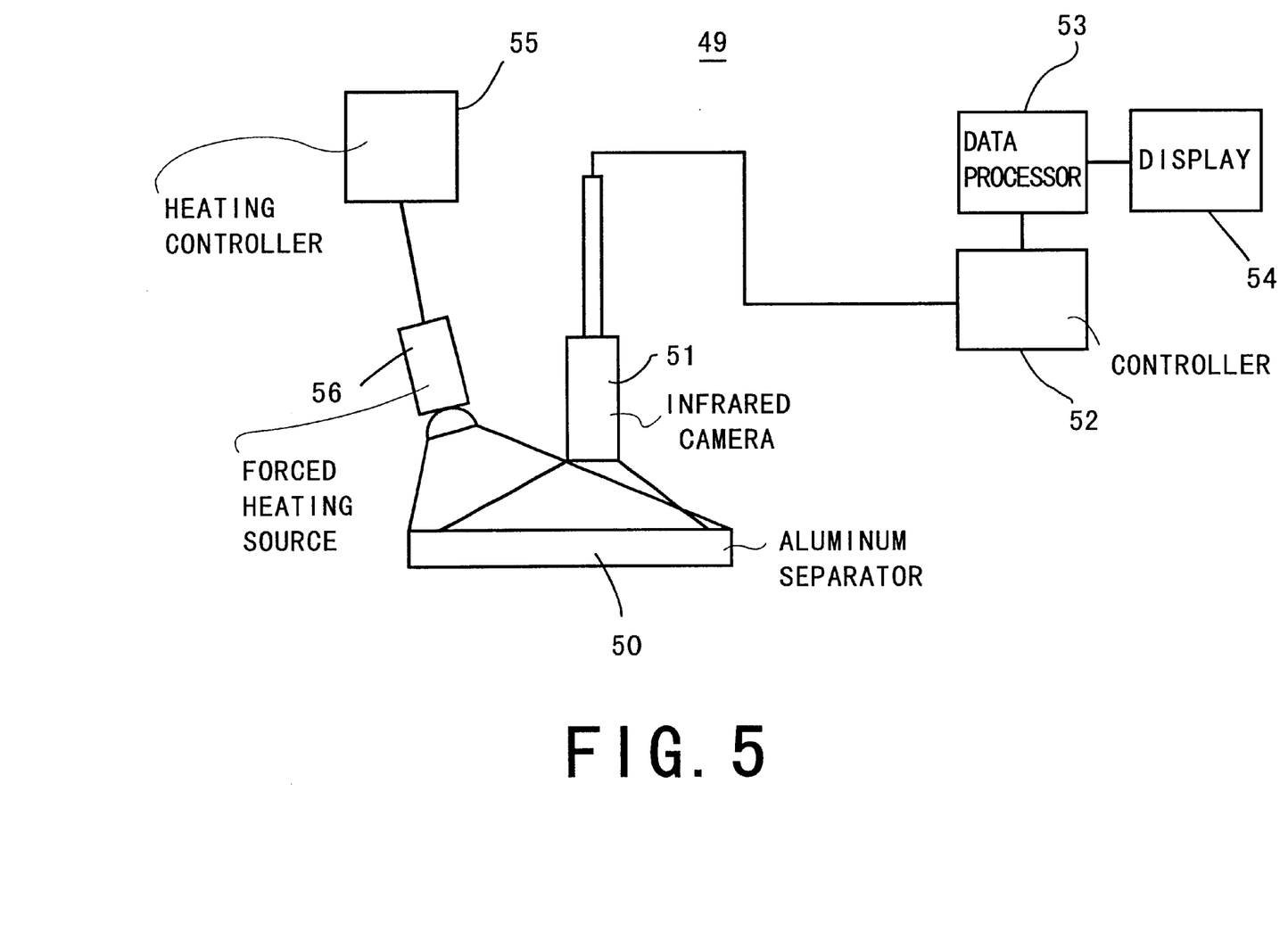
FIG. 5 is a diagram showing the non-destructive inspection by the infrared thermography according to a fifth embodiment of the present invention.

Fifth Embodiment (FIG. 5)

Hereinafter, a fifth embodiment of this invention will be described with reference to FIG. 5.

In this embodiment, the non-destructive inspection was conducted by the infrared thermography on the surface of a separator after the die casting and on the surface of a separator applied with the corrosion resistance coating.

FIG. 5 is a diagram showing the non-destructive inspection by the infrared thermography.

As shown in FIG. 5, an infrared thermography 49 is composed of an infrared camera 51 which detects infrared energy arranged above an aluminum separator 50 that is to be inspected and a controller 52 for controlling infrared camera 51. A data processor 53 for processing data collected by infrared camera 51 and controller 52 is connected to controller 52, and a display 54 is connected to data processor 53 for displaying the result of the data processing.

Further, above aluminum separator 50 that is to be inspected, there is arranged a forced heating source 56, to which a heating controller 55 is connected.

Using infrared thermography 49, the surface of aluminum separator 50 after the die casting was observed by infrared camera 51, so that the casting defects existing in aluminum separator 50 can be inspected non-destructively in a short time. At this time, using the external heating process, the temperature change on the surface of aluminum separator 50 is measured by heating it by force with heating controller 55.

For example, when a casting defect exists in the substrate of aluminum separator 50, the temperature of the defective portion becomes abnormally high. Accordingly, the defective portion presents a temperature distribution clearly different from that of the portion having no defect. This is because the coefficient of heat conduction of the defective portion drops and the flow of heat conduction is disturbed, and therefore the defective portion shows a tendency for becoming higher temperature than other portion having no defect. At this time, it is possible to make a shape and size of a defect clear by calculating a temperature gradient from the temperature distribution of the defective portion and other portion having no defect. In other words, at the boarder between a defective portion and other portion having no defect, a large temperature gradient is produced, and by calculating its maximum temperature gradient, the shape and size of the defect can be obtained. Further, this non-destructive inspection is performed for both the separators after the trimming and after the corrosion resistance coating.

Therefore, according to this embodiment, it is possible to quickly detect casting defects caused during the die casting and defects in the coating film caused during the corrosion resistance coating by the non-destructive inspection. As a result, it is possible to reflect the result of the inspection for the improvement of manufacturing conditions and thereby to provide highly reliable separators.

Further, as for the non-destructive inspection, in addition to the infrared thermography described above, the eddy current testing, the magnetic particle testing, the penetration inspection, the ultrasonic testing, the electromagnetic induction inspection, the acoustic emission testing, the macroscopic inspection, the radiograph inspection, the laser holography inspection and the acoustic inspection are available, and anyone of these methods is usable.

As described above, according to a separator of a proton exchange fuel cell and its manufacturing method according to this invention, it is possible not only to reduce separator manufacturing costs but also to simplify a system by making separators compact and light and furthermore, to provide a long life and highly reliable proton exchange fuel cell.

Obviously, numerous modifications and variations of the present invention are possible in light of the above teachings. It is therefore to be understood that within the scope of the appended claims, the invention may be practiced otherwise than as specifically described herein.

What is claimed is:

1. A method of manufacturing a separator for a proton exchange fuel cell, comprising the steps of:

preparing an alloy selected from the group consisting of:
an alloy (in weight %): Cu: 0.3–0.4%, Si: 12.0–12.2%, Mg: 0.08–0.11%, Mn: 0.23–0.24%, Fe: 0.64–0.74%, Zn: 0.09–0.10%, and Al: the remainder;
an alloy (in weight %): Cu: 1.9–2.5%, Si: 9.4–10.4%, Mg: 0.21–0.25%, Mn: 0.16–0.38%, Fe: 0.72–0.93%, Zn: 0.42–0.93%, Al: the remainder;
an alloy (in weight %): Cu: 0.01%, Si: 0.1%, Mn: 0.80%, Fe: 0.09%, Ni: 0.01%, Ti: 0.01% and Al: the remainder;
an alloy (in weight %): Mn: 1.4–4.3%, Fe: 0.5–1.0%, and Al: the remainder;
an alloy (in weight %): Cu: 0.05%, Co: 1.0% and Al: the remainder; and
an alloy (in weight %): Mn: 2.0%, Zn: 3.0%, Fe: 1.0%, Mg: 0.5% and Al: the remainder; and forming said separator from said alloy by die casting.

2. The method according to claim 1, wherein said die casting is one or more of vacuum die casting, oxygen atmospheric die casting, atmospheric flow die casting, rheo-casting, acurad process, low speed filling die casting, high pressure casting, balance type flow die casting, car process, or parashot process.

3. The method according to claim 1, further comprising the step of:

treating a surface of said separator formed by said die casting by one or more of buffing, barrel finishing, blasting, electro-polishing, and chemical treatment, such that surface roughness of said separator is 0.07 μm or more.

4. The method according to claim 3, further comprising the step of:

trimming said separator formed by said die casting and treated by said surface treating step by one or more of press machining, electric discharge machining, laser beam machining and photo-etching.

5. The method according to claim 4 wherein said surface of said separator after said trimming step is treated again by a second surface treating step.

6. The method according to claim 5, further comprising the step of:

coating a corrosion resistant film on said surface of said separator after said surface of said separator is made rough by said surface treating step by one or more of physical evaporation process, plating process and spray process.

7. The method according to claim 6, further comprising the step of:

inspecting said surface of said separator, after said die casting or after said corrosion resistant film is formed, by one or more of infrared thermography, eddy current testing, magnetic particle testing, penetration inspection, ultrasonic testing, electromagnetic induction inspection, acoustic emission testing, macroscopic inspection, radiograph inspection, laser holography inspection and acoustic inspection.

8. A separator for a proton exchange fuel cell, wherein said separator is manufactured by the method of claim 1.

9. The method according to claim 6 wherein said coating is selected from the group consisting of one or more of Ni, Fe, Co, B, Pb, Cr, Cu, Ti, Bi, Sn, W, P, Mo, Ag, Pt, An, TiC, NbC, TiCN, TiN, CrN, $TiB_2$, $ZrB_2$, $Fe_2B$ and $Si_3N_4$.

10. The method according to claim 6, wherein said step of coating is said plating process and said coating is Au with Ni or Cr thereon.

11. The method according to claim 6, wherein said step of coating is said physical evaporation process and said coating is Cr or an alloy thereof with TiN or an alloy thereof thereon.

12. The method according to claim 11, wherein said coating in order from said separator surface is Cr or an alloy thereof, TiN or an alloy thereof, Cr or an alloy thereof and TiN or an alloy thereof.

13. The method according to claim 3 further comprising the step of: electrically, mechanically or chemically removing any passive state film or oxides.

14. The method according to claim 4, wherein said trimming comprises forming induction ports and discharging ports on said separator.

15. The method according to claim 1, wherein said alloy has a thermal conductivity of 100–230 W/mK.

16. The method according to claim 1, wherein said alloy has an electric conductivity of 30–60% against the standard aluminum electric conductivity at 20° C.

17. The method according to claim 1, wherein said separator is formed by said die casting such that thickness of said separator is 0.4 mm or more.

18. The method according to claim 1, wherein the alloy is selected from the group consisting of:

an alloy (in weight %): Cu: 0.3–0.4%, Si: 12.0–12.2%, Mg: 0.08–0.11%, Mn: 0.23–0.24%, Fe: 0.64–0.74%, Zn: 0.09–0.10%, and Al: the remainder;
an alloy (in weight %): Cu: 1.9–2.5%, Si: 9.4–10.4%, Mg: 0.21–0.25%, Mn: 0.16–0.38%, Fe: 0.72–0.93%, Zn: 0.42–0.93%, Al: the remainder;
an alloy (in weight %): Cu: 0.01%, Si: 0.1%, Mn: 0.80%, Fe: 0.09%, Ni: 0.01%, Ti: 0.01% and Al: the remainder;
an alloy (in weight %): Mn: 1.4–4.3%, Fe: 0.5–1.0%, and Al: the remainder; and
an alloy (in weight %): Cu: 0.05%, Co: 1.0% and Al: the remainder.

* * * * *